July 2, 1957  J. E. GROBL  2,797,869
TENS-TRANSFER CONTROL MEANS IN A DECIMAL
ELIMINATION MECHANISM
Filed Feb. 15, 1954  4 Sheets-Sheet 1

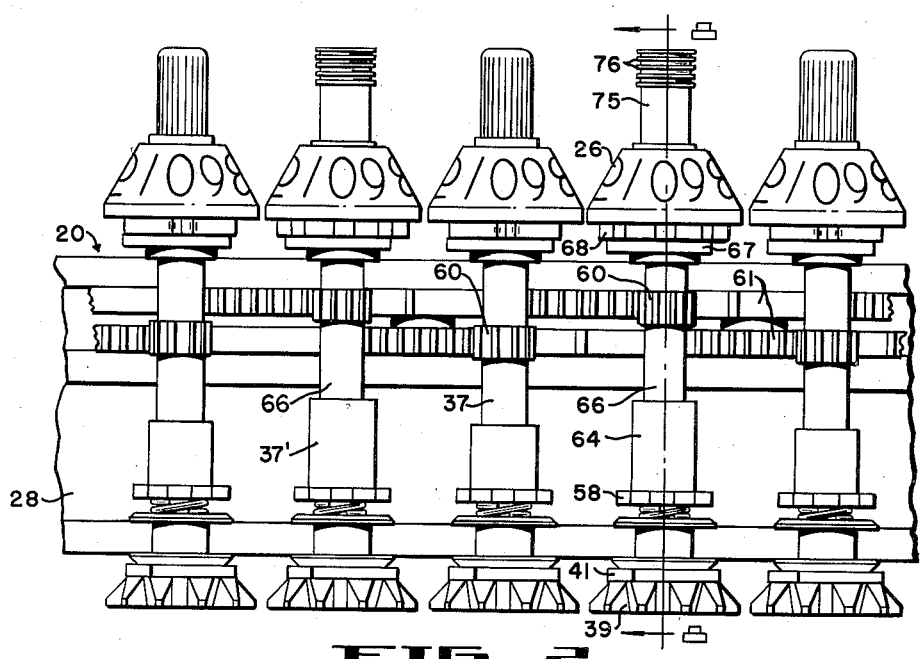
FIG_2
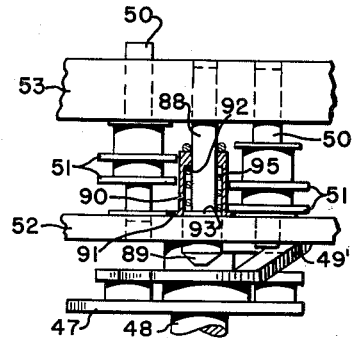
FIG_3
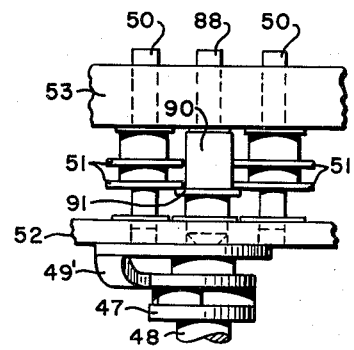
FIG_4
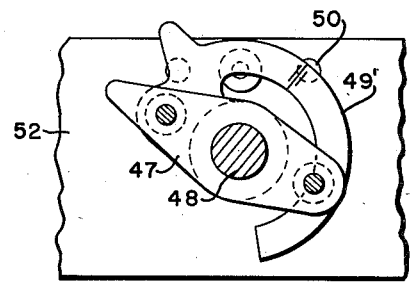
FIG_5
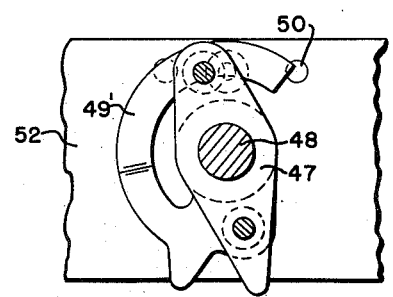
FIG_6

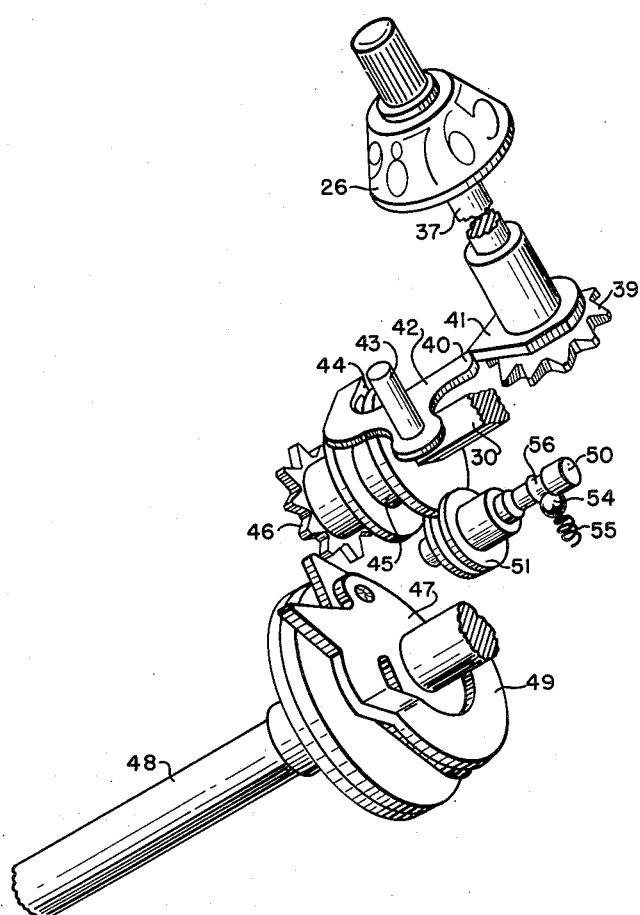

July 2, 1957
J. E. GROBL
2,797,869
TENS-TRANSFER CONTROL MEANS IN A DECIMAL
ELIMINATION MECHANISM
Filed Feb. 15, 1954
4 Sheets-Sheet 4
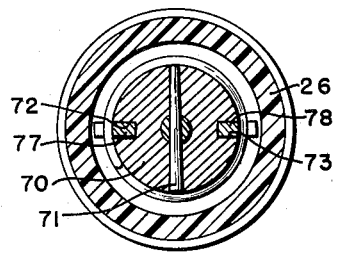
FIG_9
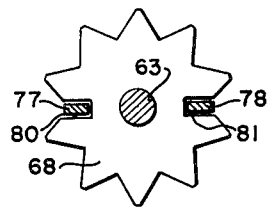
FIG_10
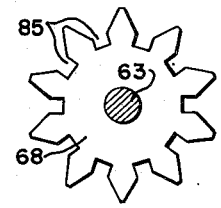
FIG_11
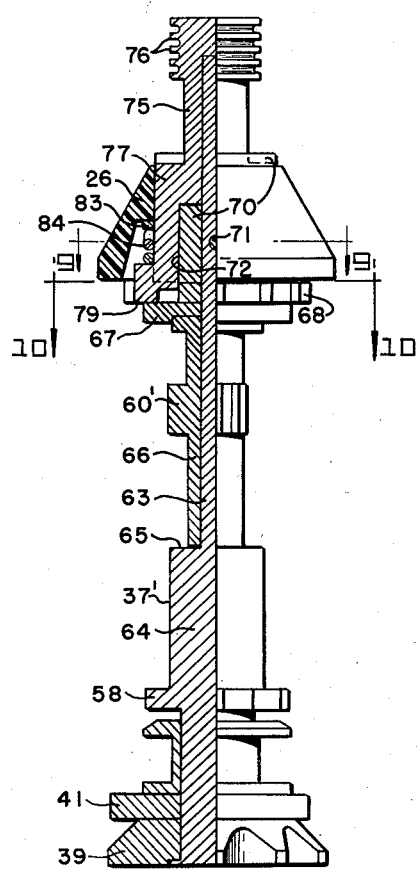
FIG_8

United States Patent Office 2,797,869
Patented July 2, 1957

2,797,869

TENS-TRANSFER CONTROL MEANS IN A DECIMAL ELIMINATION MECHANISM

Jon E. Grobl, Oakland, Calif., assignor to Friden Calculating Machine Co., Inc., a corporation of California Application February 15, 1954, Serial No. 410,124

7 Claims. (Cl. 235—63)

This invention relates to register mechanisms of calculating machines, such as the well-known Friden calculating machine, and more particularly to mechanisms whereby a constant factor, such as a half-cent factor, can be added into the register and retained therein through register clearing operations.

It is among the objects of the invention to provide an improved calculating machine register mechanism which includes a series of ordinally arranged register dials at least some of which can be manually set to selected values other than zero and will be automatically returned to their set values whenever the register is cleared; which can be used for rounding off values, such as the cents fractions in monetary calculations; which may operate at various positions of the machine carriage; in which the manually settable dials can be manually set to selected values without causing any erroneous tens-transfer in the register mechanism but do not interfere with the normal tens-transfer operation or with the manual or automatic clearing of the register; and which may be provided in one form wherein the settable register dials may be set at either their "0" or "5" positions, and in a modified form wherein the settable register dials can be set at any position from "0" to "9."

Other objects and advantages will become apparent from a consideration of the following description and the appended claims in conjunction with the accompanying drawings wherein:

Fig. 2 is a fragmentary elevational view looking from a plane indicated by the line 2—2 of Fig. 1;

Fig. 3 is a fragmentary plan view looking from a plane indicated by the line 3—3 of Fig. 1;

Fig. 4 is a view similar to Fig. 3 but with the parts in a different operative position from that illustrated in Fig. 3;

Fig. 5 is a fragmentary cross-sectional view on a plane indicated by the line 5—5 of Fig. 1;

Fig. 6 is a cross-sectional view similar to Fig. 5 but with the parts in a different operative position from that shown in Fig. 5;

Fig. 7 is a perspective view of one of the register dial assemblies and the operating mechanism therefor;

Fig. 8 is a cross-sectional view on an enlarged scale on a plane indicated by the line 8—8 of Fig. 2;

Fig. 9 is a cross-sectional view on the line 9—9 of Fig. 8;

Fig. 10 is a cross-sectional view on a plane indicated by the line 10—10 of Fig. 8; and Fig. 11 is a cross-sectional view similar to Fig. 10 but showing a somewhat modified form of the invention.

Figure 1:
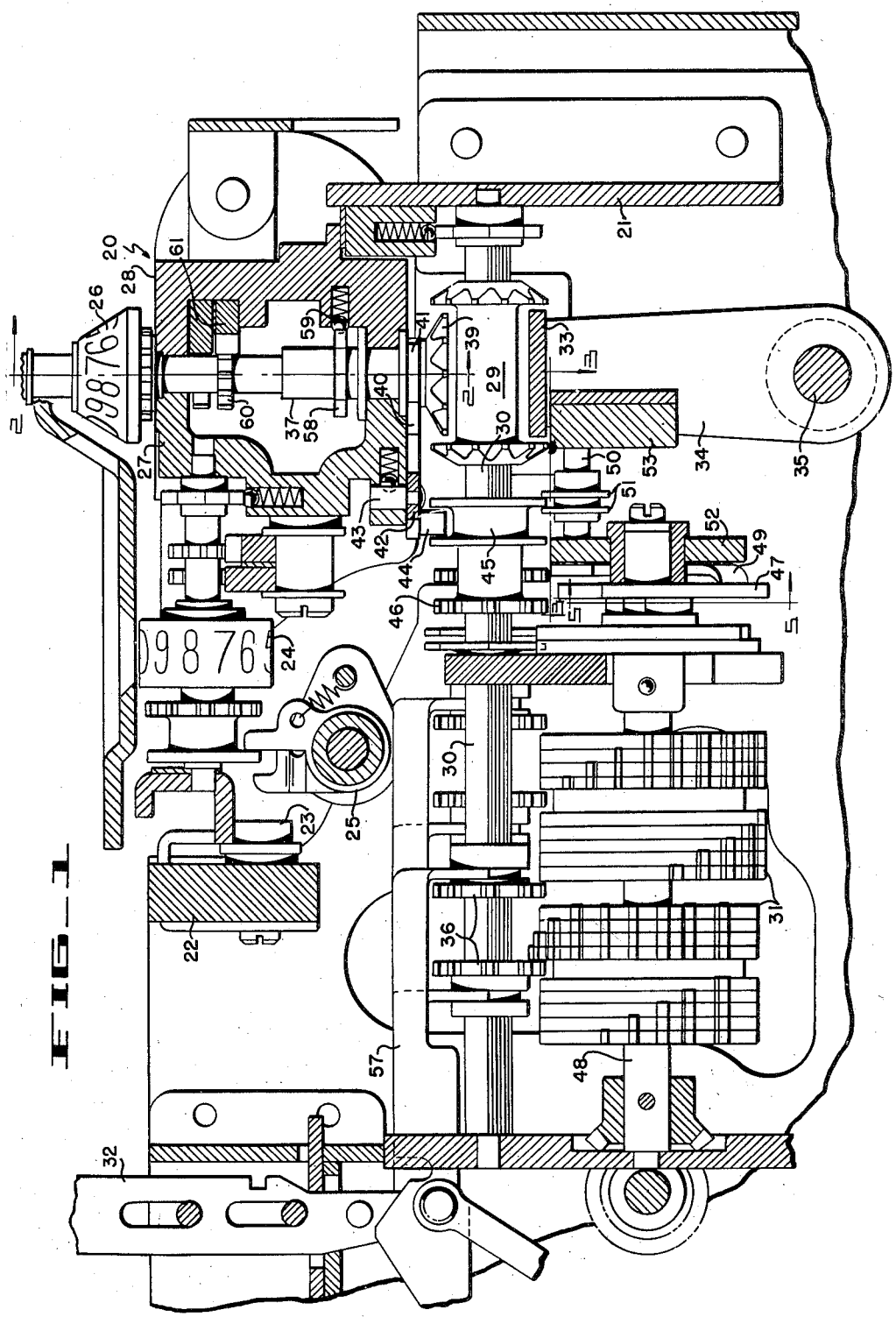
Figure 1 is a cross-sectional view of the rear portion of a Friden calculating machine having the usual selection and actuating mechanisms and a shiftable numeral wheel carriage provided with means for selectively re-entering a constant factor into the accumulator as part of the clearing operation of the accumulator.

With continued reference to the drawings, the invention is illustrated as embodied in the type of calculating machine disclosed in Carl M. Friden Patents No. 2,229,889 patented January 28, 1941, and No. 2,294,111 patented August 25, 1942, the general arrangement and operation of such a standard Friden calculating machine being well known.

As particularly shown in Figs. 1 and 2, the machine is provided with a shiftable register carriage 20 mounted for endwise sliding movement on frame cross plate 21, and on transverse bracket 22 by means of rollers 23. The register carriage 20 serves to mount the numeral wheels or dials 24 of a revolutions counter mechanism and an actuator 25 of suitable construction is carried by the machine frame and operatively associated with the revolutions counter to drive the latter. The carriage 20 also mounts a series of ordinally arranged numeral wheels or dials 26, which constitute the accumulator or product register of the machine, each such dial being mounted on a shaft 37 which is suitably journalled between the front and rear carriage frames 27 and 28 and arranged for actuation through a pinion drive gear 39 which is secured on the lower end of shaft 37 and engageable with suitable plus-minus gearing 29 having a sliding engagement with a square drive shaft 30, and driven by the drive shaft.

A pair of selection gears 36, also slidably and non-rotatably supported on the square shaft 30, are operable to receive from the coacting selection slides 57 differential increments of movement relative to an associated actuating drum 31, which increments of movement bear a predetermined relationship to the numerical value of a keyboard amount key 32 which has been depressed in the same order. Hence, the stepped teeth on the associated actuating drums 31 unidirectionally rotate the coacting square shafts 30 to an angular extent controlled by the usual bank of numeral keys associated with each order of the keyboard. During digitation, the sign character of registration for the accumulator dials 26 is controlled by shifting of the plus-minus gearing 29 for selective driving engagement with pinion gear 39 under control of a strap or gate 33 which is mounted by suitable upright arms 34 on a transverse, rockable shaft 35 adapted to be controlled in any convenient manner in performing calculating operations, as by manually depressing the plus key or the minus key of the machine.

Secured to the lower end of the dial shaft 37 for each of the accumulator wheels or dials 26 is a tens-transfer cam or tooth 41 which projects radially from the corresponding shaft and is adapted to cooperate with a transfer lever 42 pivotally mounted by a stud 43 on the bottom portion of the front carriage frame 27 and provided at one end with a tongue formation 40 with which the corresponding tens-transfer tooth 41 engages and at its other end with a downwardly depending lug 44 which lies between a pair of flanges provided on hub 45 of a tens-transfer gear 46 slidably mounted on the square shaft 30 located in the order of the machine next above that in which the corresponding tens-transfer cam or tooth 41 is located. As is fully shown and described in the Friden Patent No. 2,229,889, mentioned above, a single tooth on the transfer cam 41 rocks the associated transfer lever 42 by engagement with the tongue formation 40 on the lever whenever the corresponding accumulator dial 26 passes through its "0" position from "0" to "9" or from "9" to "0," thereby causing the lug 44 to move the transfer gear 46 in the next higher order of the accumulator into the path of a single tooth tens-transfer actuator 47 carried by the actuator shaft 48 which carries the corresponding stepped drums 31. After each such tens-transfer operation has been completed, the transfer gear 46 is returned to its normal inoperative or full-cycle position, out of the path of the coacting actuator 47, by engagement of the restore cam 49 carried on the actuator shaft 48 adjacent to the actuator 47 with the adjacent end of a detenting pin or restoring actuator 50. The detenting pins 50 are slidably mounted at their opposite ends in frame members 52 and 53 of the machine and each is provided intermediate its length with a pair of spaced-apart flanges 51 which receive between them one of the flanges on the hub 45 of the corresponding tens-transfer gear 46. Ball detents 54 are provided in sockets in the frame member 53 and urged by springs 55 into grooves 56 in corresponding pins 50 to releasably latch or detent the pins 50 in position to hold the tens-transfer gears in their operative position in which they will be actuated by the corresponding tens-transfer actuators 47, or in their inoperative position. After the tens-transfer has been made, in the manner indicated above, and before the end of the machine cycle in which the tens-transfer was made, the corresponding restore cam 49 engages the adjacent end of the corresponding detenting pin 50 and forces this pin to slide in a direction to restore the tens-transfer gear 46 to its normal or full-cycle position in which it is out of the path of the single tooth of the corresponding tens-transfer actuator 47.

Each of the accumulator dial shafts 37 carries near its lower end and within the carriage frames 27 and 28, a star wheel 58 engaged by a spring detent 59 mounted in a socket in the rear carriage frame 28, the detented wheel 58 having the effect of resiliently centering the dial assembly at any numeral position to which the assembly may be rotated. Also within the carriage frames each shaft 37 carries a mutilated resetting gear 60, and a clearing rack 61 extends longitudinally of the carriage frame in a guideway provided in the inner side of the rear frame member 28 and near the top of this rear frame member. The clearing rack 61 is provided with rack teeth and, when longitudinal movement is imparted to the clearing rack 61, either manually or by the power operation of the machine, these rack teeth engage the resetting gears 60 and return all of the accumulator dial assemblies to their normal or full-cycle "0" position, as is fully explained in the Friden patents referred to above.

For certain kinds of computations, it is desirable that at least some of the register dial assemblies be manually settable so that, when the register is cleared by operation of the clearing rack 61 those assemblies which have been manually set, instead of being returned to their "0" positions will be returned to a different position so that a manually selected, constant factor will be entered back into the register each time the register is cleared. While the modified accumulator dial assemblies may be designed, if desired, to enable the return of any selected constant factor back to the register when the register is cleared, a particular example of such an arrangement resides in the so-called "half-cent" mechanism wherein one or more of the register dial assemblies is so constructed that it can be manually set so that, when the register is cleared, the manually set assembly or assemblies, instead of returning to their "0" position, will be returned to their "5" position or half-cent position.

With such an arrangement, if a fraction of a cent greater than one half-cent is added into the machine the dial assembly set to the half-cent position will be turned past its "0" position and a full cent will be added into the register whereas, an entry of a fraction of a cent less than one-half cent will fail to turn the half-cent dial assembly through its "0" position and this addition will not cause a tens-transfer, but will be lost in the clearing of the register, the manually set dial being covered so that the figures thereon are not read by the operator. However, when cent fractions less than one-half cent are accumulated until their value exceeds one-half cent, such accumulated values added to the half cent already in the machine will cause a tens-transfer and automatically record the full-cent value in the accumulator.

In multiplication or division, if the product, in the case of multiplication, comes out with a fractional-cent value greater than one half the machine will automatically record a full one-cent value rather than the fraction and, in the case of division, if the resultant has a fractional-cent value greater than one half, the full-cent value will also be automatically recorded and, in the case of accumulation of products or resultants, the full-cent values will be added or multiplied giving a total in which the cent fractions have been rounded off to full-cent values. The operation of the half-cent dial assemblies is thus to round off the cent fractions so that a cent will be added to the total for each fraction of a cent greater than one half and the fractions less than one-half cent will be lost, thereby averaging the cent fractions out to whole-cent values.

In order to provide for the manual setting of a constant factor, such as a half-cent value, into the register or accumulator of the machine, at least one and preferably several of the accumulator dial assemblies are modified so that the dials or numeral wheels thereof can be set at angles relative to the corresponding resetting gears 60 to return the dials to a selected position other than their "0" position whenever the register is cleared and whether the clearing be done manually or automatically. When more than one register dial assembly is thus modified the modified dial assemblies are located at selected or predetermined orders along the register so that they will be at the proper locations for the positions of the carriage relative to the keyboard of the machine for the various types of computations which it is proposed to carry out with the machine having the modified register dial assemblies.

In each of the modified accumulator dial assemblies as shown in Figs. 8 and 9, the dial shaft 37' has its upper portion 63 coaxial with, but of smaller diameter than its lower portion 64 providing at the juncture of the upper and lower portions an annular shoulder 65 intermediate the length of the shaft 37' and within the space between the front and rear frames 27 and 28 of the carriage. The resetting gear 60' is not rigidly secured on the associated shaft 37' but is provided intermediate the length of a sleeve 66 which is journalled on the reduced, upper portion 63 of the shaft 37', and which sleeve has its lower end resting on the shoulder 65 and its upper end bearing against the underside of a zero stop dog 67 in the form of a flat disk disposed immediately above the top surface of the front and rear carriage frames and provided with a central aperture receiving the reduced upper portion 63 of the shaft.

A detenting star wheel 68 is disposed immediately above the zero stop dog 67 and this star wheel 68 and stop dog 67 are both rigidly secured to the top end of the reset gear sleeve 66.

A bushing 70 receives the reduced upper portion 63 of the shaft 37' immediately above the star wheel 68 and is rigidly secured on the shaft 37' by a through pin 71 which extends transversely through the shaft and the bushing. This bushing 70 is provided with diametrically opposite slots 72 and 73 extending longitudinally therof.

A dial twirler 75 is provided with a hollow upper portion of cylindrical shape receiving the upper end portion of the reduced portion 63 of the dial shaft 37' and this twirler is provided at its upper end with a series of external circumferential ribs or ridges 76 to facilitate lifting the twirler as well as rotating it by the fingers. At its lower end the twirler is provided with a flat, bifurcated portion having spaced apart and substantially parallel legs 77 and 78 which are slidably received respectively in the slots 72 and 73 in the bushing 70. At their distal ends the legs 77 and 78 are provided with offset detent portions, as indicated at 79 in Fig. 8, which are received in corresponding diametrically opposite notches 80 and 81 provided in the star wheel 68 which is secured to the resetting gear sleeve 66, as described above.

The numeral wheel or dial 26 is of annular shape and receives and is secured to the bushing 70, extending over the outer edges of the slots 72 and 73 in the bushing. The lower portion of the dial 26 is hollowed out to provide an internal annular shoulder 83 within the dial, and a compression spring 84 surrounds the bushing 70 and bears at its upper end against the shoulder 83 in the dial and at its lower end on the laterally offset terminal portions 79 of the twirler legs 77 and 78 thereby resiliently urging the twirler toward the star wheel 68.

With the above-described arrangement, when the terminal portions 79 of the twirler legs are received in the notches 80 and 81 in the star wheel, the dial 26 is locked to the resetting gear 60' at a predetermined rotational position, there being two possible positions for the form of star wheel shown in Fig. 10, in one of which the dial or number wheel 26 presents a "0" at the sight opening in the machine cover and in the other of which it presents a "5" at the sight opening when the product register is cleared.

By pulling upwardly on the twirler 75 until the lower ends of the twirler legs 77 and 78 are moved upwardly out of the notches 80 and 81 in the star wheel 68, the dial and twirler, together with the bushing 70 and shaft 37', are rotationally freed from the resetting gear 60' and may be turned relative to the resetting gear to position the dial in either its "5" or its "0" position, as may be desired, and correspondingly change the angular position of the tens-transfer cam 41. The resetting gear 60' may be held against rotation while the dial 26 and shaft 37' are being rotated in the resetting gear sleeve 66 by moving the resetting rack 61 sufficiently to the right for the gear teeth on the rack to engage the teeth on the gear 60' and thus hold the gear against rotation.

In the modified star wheel 68', illustrated in Fig. 11, there are ten notches 85 arranged in five pair of diametrically opposed notches and, when a star wheel of the form shown in Fig. 11 is substituted for a star wheel of the form shown in Fig. 10 the dial 26 and shaft 37' may be set at any one of ten different rotational positions relative to the resetting gear 60' so that any number on the dial 26 from "0" to "9" can be brought opposite the sight opening in the machine cover when the register is cleared by operation of the clearing rack. With this modified arrangement and with several of the accumluator dial assemblies modified, as described above, any selected one of various constant factors may be re-entered into the machine at the end of register clearing operations.

Since the dial shaft 37' and the associated tens-transfer cam 41 rotate with the dial 26 and the twirler 75 when the dial is turned from one to another of its selectively settable positions, it may happen that the cam 41 will be moved past the tongue 40 of its associated actuating lever 42 while the shaft 37' is being manually turned, as described above, and it will also happen that cam 41 will at times be moved past the tongue of its associated lever 42 during the clearing of the register and the return of the corresponding dial to its selectively set position when the dial is set to return to a position other than its "0" position. If no means were provided to nullify the effect of this action, such action of the cam 41 on its associated lever 42 would set up a tens-transfer operation during the manual setting or the clearing operation and cause an erroneous tens-transfer to occur during a subsequent digitation operation of the machine.

In order to eliminate the possibility of such an erroneous tens-transfer the detenting pins 50 actuated by the levers 42 corresponding to the modified accumulator dial assemblies, are cut off at their ends nearest the restore cams 49' so that this cam is not effective to restore these detenting pins by engaging the adjacent ends thereof. A pin 88, Figs. 3 and 4, is extended through the machine frame pieces 52 and 53 midway between two cutoff detenting pins 50 controlled by the same restore cam 49' and the end of this pin 88 nearest the cam is extended and tapered to provide an abutment portion 89 which is engaged by the cam 49 so that the pin 88 is moved in a direction away from the cam when the cam rotates with the actuator shaft 48.

A thimble 90, preferably of cylindrical shape, receives the pin 88 between the frame pieces 52 and 53 and this thimble has at its end nearest the frame piece 52 and cam 49, an outwardly directed annular flange 91 which overlaps the flanges 51 on the associated pins 50 nearest the cam 49' and is disposed at the sides of the flanges 51 nearest the cam. At its end remote from the frame pieces 52 the thimble 90 is provided with an internal annular shoulder 92 and the pin 88 is provided adjacent the side of the frame piece 52 remote from the cam 49' with an external annular shoulder 93. A compression spring 95 surrounds the pin 88 within the thimble 90 and bears at one end against the thimble shoulder 92 and at its other end against the pin shoulder 93 and, together with the thimble 90, provides a resilient connection between the pin 88 and the adjacent detenting pins 50.

With the above-described arrangement, when the restore cam 49' is in engagement with the adjacent end portion 89 of the pin 88 forcing this pin in a direction away from the cam, the flange 91 on the thimble 90 engages the adjacent flanges 51 on the associated detenting pins 50 and urges these detenting pins and the corresponding transfer gears 46 to the inoperative position of the transfer gears. If, while the pin 88 is held in retracted position by the cam 49', as explained above, a tens-transfer cam 41 on one of the modified register dial assemblies engages an associated lever 42 connected with one of the detenting pins 50 adjacent the pin 88 and thimble 90, the detenting pin and the associated tens-transfer gear 46 will be moved to the operative position of the gear but will be immediately retracted by the spring 95. As the square shafts 30 will not be connected to the corresponding dial shafts 37 at the time the modified accumulator dial assembly is being manually rotated or while the accumulator is being cleared, this movement of the tens-transfer gears to and immediately away from their operative position will not cause an erroneous tens-transfer in the register if a digitation cycle follows the resetting or clearing operation.

The restoring cams 49 are of partly circular, spiral formation and those restoring cams 49' which engage the thimble carrying pins 88 of the modified arrangement are elongated so that all of the pins 88 will be positively held in retracted position between operating cycles of the machine and also during those portions of the operating cycles in which automatic clearing of the register takes place, the cams being free of the corresponding pins during those portions of the cycle when tens-transfer operations normally occur.

In the Friden calculator as described in the above-noted Friden patents, the tens-transfer actions take place in a wavelike manner from the lower to the higher order of the register and the modified restore cams 49' are sufficiently elongated not only to restore all of the spring carrying pins 88 and associated detenting pins 50 which have been moved to operative position before the end of the cycle, but to hold all of the pins 88 in retracted position during the latter portion of the operating cycle.

The above-described arrangement thus permits the setting of at least one and preferably several of the accumulator dial assemblies to either one of two different numeral positions or, in the case of the modified arrangement shown in Fig. 11, to any one of ten different positions, without causing an erroneous tens-transfer in the accumulator and without interfering with the normal tens-transfer operation from a lower to a higher order of the accumulator dial assemblies.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a calculating machine having a register including a plurality of ordinally arranged dial assemblies each comprising a dial, a tens-transfer member rotatable with said dial and a resetting member, register clearing means engageable with the resetting members to clear said register by resetting the dials to their "0" positions, tens-transfer means associated respectively with said dial assemblies and each set by the tens-transfer member of its associated dial assembly when such dial assembly passes through its "0" position to effect a tens-transfer from its associated dial assembly to the dial assembly of the next higher order during a portion of a machine operating cycle subsequent to the setting of said tens-transfer means, manually releasable clutch means connected between at least one of said dials and the associated resetting member to provide for manually setting the corresponding dial to selected angular positions relative to the resetting member of the same dial assembly so that the corresponding dial and tens-transfer member will assume a selected position other than its "0" position when said register is cleared, and means connected to the tens-transfer means associated with the dial assembly having said manually settable dial to effect the immediate restoration of such tens-transfer means if set during the manual setting of the corresponding dial to thereby preclude the accomplishment of an erroneous tens-transfer during a subsequent operating cycle of the machine.

2. In a calculating machine having a register including a plurality of ordinally arranged dial assemblies each comprising a tens-transfer element, a dial rotatable with said tens-transfer element and a resetting member, register clearing means engageable with the resetting members to normally reset the dials to their "0" positions, tens-transfer means associated one with each dial assembly and each settable to operative position to effect a tens-transfer from the associated dial assembly to the dial assembly of the next higher order when the associated dial assembly is turned through ten unit spaces from its "0" position, means operative during an operating cycle of the machine to drive said tens-transfer means to complete the tens-transfers, manually releasable clutch means included in at least one of said dial assemblies and effective to free the corresponding resetting member from the dial and tens-transfer element associated therewith so that such dial can be turned to a rotational position other than its "0" position when said register is cleared, and resilient means connected to the tens-transfer means corresponding to any dial assembly provided with manually releasable clutch means and effective to immediately restore the tens-transfer means associated with such dial assembly when such tens-transfer means is set by manual rotation of the corresponding dial or by the rotation of such corresponding dial assembly during the clearing of said register while such dial is set to clear to a position other than its "0" position to thereby preclude the accomplishment of an erroneous tens-transfer during a subsequent operating cycle of the machine.

3. In a calculating machine having a register including a plurality of ordinally arranged dial assemblies each including a tens-transfer element, a dial rotatable with said tens-transfer element and a resetting gear, register clearing means engageable with said resetting gears, drive shafts connectable with said dial assemblies for driving the latter, tens-transfer means associated one with each dial assembly and each settable by the tens-transfer element of the corresponding dial assembly when the latter turns in either direction through its "0" position to condition the associated tens-transfer means for a tens-transfer to the dial assembly of the next higher order, means operative during operation of the machine subsequent to the setting of said tens-transfer means to operate said conditioned tens-transfer means, manually releasable clutch means included in at least one of said dial assemblies and effective to free the corresponding resetting gear from the dial and tens-transfer element associated therewith so that such dial can be turned to a rotational position other than its "0" position when said register is cleared, and resilient means connected to the tens-transfer means corresponding to that dial assembly provided with manually releasable clutch means and effective to immediately restore the tens-transfer means associated with such dial assembly if that tens-transfer means is set by rotation of the corresponding dial assembly manually or by said register clearing means past the "0" position of its tens-transfer element, to thereby avoid the entry of an erroneous tens-transfer in said register during a subsequent operation of the machine immediately following such manual rotation of the dial of said one dial assembly or a register clearing action with the dial of said at least one dial assembly manually set to clear to a position other than its "0" position.

4. In a calculating machine having a register including a plurality of ordinally arranged dial assemblies each comprising a rotatable dial shaft, a tens-transfer cam fixed on said shaft, a dial fixed on said shaft and a resetting gear journalled on said shaft, register clearing means engageable with said resetting gears to normally reset said dials to their "0" positions, means connectable to said dial assemblies for differentially turning the dial assemblies through angular intervals corresponding to the ordinal digits of values entered into the machine, tens-transfer means associated respectively with said dial assemblies and each set by said tens-transfer cam when the associated dial assembly is turned through its "0" position to condition said tens-transfer means for a tens-transfer from the associated dial assembly to the dial assembly of the next higher order, means operative during operation of the machine subsequent to the setting of said tens-transfer means to operate said conditioned tens-transfer means, manually releasable clutch means included in at least some of said dial assemblies and effective to free the corresponding dials and tens-transfer cams from their resetting gears and enable rotational adjustment with respect thereto so that such dials can be turned to a rotational position other than their "0" position when said register is cleared, and resilient means connected to the tens-transfer means corresponding to those dial assemblies provided with manually releasable clutches and effective to immediately restore to inactive condition any tens-transfer means set by manual rotation of the corresponding dial and tens-transfer cam or by the rotation of said dial assemblies during the clearing of said register to thereby avoid the entry of an erroneous tens-transfer in said register during an operation of the machine immediately following such manual dial setting or register clearing action.

5. In a calculating machine having a register including a plurality of ordinally arranged dial shaft assemblies each comprising a dial shaft, a gear fixed on one end of said dial shaft, a tens-transfer cam fixed on said shaft, a dial fixed on said shaft in spaced relationship to said gear, and a mutilated resetting gear mounted on said shaft, a longitudinally slidable register clearing rack extending past said dial shaft assemblies and engaging said resetting gears to clear said register by resetting said dials to their "0" positions, individual drive shafts for said dial shafts, gears on said drive shafts meshable with the gears on the corresponding dial shafts, actuator shafts drivingly connectable with said drive shafts to rotate said drive shafts through angular intervals corresponding to the digits of values entered into the machine, tens-transfer cams carried by said actuator shafts, tens-transfer gears carried by said drive shafts and moved to active position by the tens-transfer cams on said dial shafts to enable a tens-transfer from one dial shaft assembly to the dial shaft assembly of the next higher order whenever said one dial shaft assembly passes through its "0" rotational position, and means effective during operation of the machine subsequent to movement of said tens-transfer gears to active position to operate said gears to effect a tens-transfer, manually releasable clutches connected between at least some of the dial shafts and the associated resetting gears to provide for manually setting the corresponding dial shafts to selected angular positions relative to their resetting gears so that the corresponding dials will assume positions other than their "0" positions when said register is cleared, and means connected to tens-transfer gears on the drive shafts of said manually settable dial shafts to effect the immediate restoration to inactive position of any tens-transfer gear moved to active position during the manual setting of the corresponding dial shafts to thereby preclude the accomplishment of erroneous tens-transfer during a subsequent operation of the machine.

6. In a calculating machine having a register including a plurality of ordinally arranged dial shaft assemblies each comprising a rotatable dial shaft, a gear fixed on said shaft, a tens-transfer cam fixed on said shaft, a dial fixed on said shaft and a resetting gear journalled on said shaft, register clearing means engageable with said resetting gears to normally reset said dials to their "0" positions, individual drive shafts for said dial shafts, gear means on said drive shafts meshable with the gears on said dial shafts to drive said dial shaft assemblies from said drive shafts, tens-transfer means on said drive shafts movable between active and inactive positions and each effective when moved to active position by said tens-transfer cams to enable a tens-transfer from the associated dial shaft assembly to the dial shaft assembly of the next higher order, levers pivotally mounted one adjacent each drive shaft assembly and each movable by the corresponding tens-transfer cam when the associated dial shaft assembly passes through its "0" rotational position to move the tens-transfer means on the drive shaft of the order next above the order of the dial shaft associated with said lever to active position, and means operative during operation of the machine subsequent to movement of said tens-transfer means to active position to operate said tens-transfer means, manually releasable clutch means included in at least some of said dial shaft assemblies and effective to free the corresponding dial shafts from their resetting gears and enable rotation of said dial shafts to rotational positions other than their "0" position when said register is cleared, and resilient means connected to the tens-transfer means corresponding to those dial shaft assemblies provided with manually releasable clutches and effective to immediately restore to inactive position any tens-transfer means moved to active position by manual rotation of the corresponding dial shaft assembly or by the rotation of said dial shaft assemblies during the clearing of said register to thereby avoid the entry of an erroneous tens-tranfer in said register during an operation of the machine immediately following such manual dial setting or register clearing action.

7. In a calculating machine having a carriage, a plurality of dial assemblies mounted in said carriage in ordinal arrangement and constituting a product register, each dial assembly including a dial shaft, a tens-transfer cam fixed on said dial shaft, a dial fixed on said dial shaft in spaced relationship to said tens-transfer cam and a resetting gear mounted on said dial shaft, a resetting rack slidably mounted in said carriage and movable to engage said resetting gears and reset said dial assemblies to their normal "0" positions and thus clear said product register, drive shafts connectable one to each of said dial shafts and effective to rotate the corresponding dial assemblies in selectively opposite rotational directions, actuator shafts drivingly connectable with said drive shafts for driving said drive shafts through angular intervals corresponding to digit values of numerical entries, tens-transfer means carried by said drive shafts and each effective when moved to its operative position and turned by the corresponding actuator shaft during an operative cycle of said machine to advance the drive shaft of the associated assembly of the next higher order one unit space, lever means mounted on the carriage in engagement with said tens-transfer means and actuated by said tens-transfer cams when said dial assemblies pass through their "0" positions to move the corresponding tens-transfer means to operative position, slidably mounted detenting pins engaging said tens-transfer means and effective to releasably detent such tens-transfer means in operative position when the corresponding lever means are actuated by the associated tens-transfer cams, and restoring cams carried by said actuator shafts and engaging said detenting pins to restore the detenting pins and tens-transfer means to inoperative position after tens-transfer has been made and before the end of the machine operating cycle in which the tens-transfer was made, the arrangement wherein at least one of said resetting gears is journalled on the corresponding dial shaft and a manually releasable clutch is included between said one resetting gear and the corresponding dial shaft whereby the dial shaft can be temporarily freed from its resetting gear and turned to an angular position relative to its resetting gear such that the corresponding dial assembly will be reset to a position other than its normal "0" position when said register is cleared, and wherein said restoring cams are elongated to resist movement of said detenting pins in a direction to move the associated tens-transfer means to operative position except during the tens-transfer portion of an operative cycle of the machine, and wherein resilient means is interposed between each detenting pin and the associated tens-transfer means to provide freedom of resiliently resisted movement between said detenting pins and the associated tens-transfer means whereby the tens-transfer cam of a dial assembly including a relatively rotatable shaft and resetting gear can be turned past its associated lever means while the machine is inoperative and the corresponding pin is held against movement by the corresponding elongated restoring cam.

References Cited in the file of this patent

UNITED STATES PATENTS

| 1,805,061 | Walter | May 12, 1931 |
| 1,995,434 | Overbury | Mar. 26, 1935 |
| 2,360,704 | Moody | Oct. 17, 1944 |
| 2,660,377 | Chall | Nov. 24, 1953 |